(12) United States Patent
O'Donovan

(10) Patent No.: US 8,032,601 B2
(45) Date of Patent: Oct. 4, 2011

(54) SYSTEM AND METHOD FOR CLIENT-BASED INSTANT MESSAGE MONITORING FOR OFF-LINE USERS

(75) Inventor: Brian O'Donovan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 12/360,018

(22) Filed: Jan. 26, 2009

(65) Prior Publication Data
US 2010/0191812 A1 Jul. 29, 2010

(51) Int. Cl.
*G06F 15/16* (2006.01)
(52) U.S. Cl. ......... 709/206; 709/207; 715/751; 715/752
(58) Field of Classification Search .................. 709/206, 709/207; 715/751, 752
See application file for complete search history.

(56) References Cited

U.S. PATENT DOCUMENTS

| 7,124,123 | B1 | 10/2006 | Roskind et al. | |
|---|---|---|---|---|
| 7,487,214 | B2 * | 2/2009 | Qureshi et al. | 709/206 |
| 7,653,693 | B2 * | 1/2010 | Heikes et al. | 709/206 |
| 2003/0041178 | A1 * | 2/2003 | Brouk et al. | 709/313 |
| 2005/0055416 | A1 * | 3/2005 | Heikes et al. | 709/207 |
| 2006/0101119 | A1 * | 5/2006 | Qureshi et al. | 709/206 |
| 2006/0259555 | A1 * | 11/2006 | Hassounah et al. | 709/206 |
| 2007/0130277 | A1 * | 6/2007 | Roskind et al. | 709/207 |
| 2007/0261105 | A1 * | 11/2007 | Drath et al. | 726/4 |
| 2008/0034040 | A1 * | 2/2008 | Wherry et al. | 709/204 |
| 2009/0248883 | A1 * | 10/2009 | Suryanarayana et al. | 709/229 |

\* cited by examiner

*Primary Examiner* — Frantz Jean
(74) *Attorney, Agent, or Firm* — Novak Druce + Quigg LLP

(57) ABSTRACT

A computer-based system for providing electronic monitoring and management services for an instant messaging (IM) user. The system can include a processor configured to execute computer-readable instructions. The system can also include an IM server, wherein the IM server accepts connections from one or more IM clients. Additionally, the system can include a bot program configured to execute on the processor. The bot program can be configured to receive a request from a first user to manage messages on behalf of the first user and further receive a token from the first user and a user name associated with the first user, wherein the first user is logged into the IM server via an IM client of the one or more IM clients. Also, the bot program can be configured to receive a notification indicating that the first user is logged off the IM server. Furthermore, the bot program can further be configured to utilize the token and the user name to log into the IM server on behalf of the first user upon receiving the notification. Moreover, the bot program can be configured to receive and store a message intended for the first user from a second user utilizing another IM client of the one or more IM clients.

39 Claims, 2 Drawing Sheets

200

```
┌─────────────────────────────────────────────┐
│ RECEIVING AT A BOT PROGRAM A REQUEST FROM A FIRST │
│ USER TO MANAGE MESSAGES ON BEHALF OF THE FIRST    │
│ USER AND RECEIVING A TOKEN FROM THE FIRST USER AND│
│    A USERNAME ASSOCIATED WITH THE FIRST USER      │
│                      202                          │
└─────────────────────────────────────────────┘
                        │
                        ▼
┌─────────────────────────────────────────────┐
│   RECEIVING AT THE BOT PROGRAM A NOTIFICATION     │
│  INDICATING THAT THE FIRST USER IS LOGGED OFF AN  │
│           INSTANT MESSAGING SERVER                │
│                      204                          │
└─────────────────────────────────────────────┘
                        │
                        ▼
┌─────────────────────────────────────────────┐
│  UTILIZING THE TOKEN AND THE USER NAME TO LOG INTO│
│   THE INSTANT MESSAGING SERVER ON BEHALF OF THE   │
│     FIRST USER UPON RECEIVING THE NOTIFICATION    │
│                      206                          │
└─────────────────────────────────────────────┘
                        │
                        ▼
┌─────────────────────────────────────────────┐
│    RECEIVING AND STORING AT THE BOT PROGRAM A     │
│  MESSAGE INTENDED FOR THE FIRST USER FROM A SECOND│
│                     USER                          │
│                      208                          │
└─────────────────────────────────────────────┘
```

FIG. 2

SYSTEM AND METHOD FOR CLIENT-BASED INSTANT MESSAGE MONITORING FOR OFF-LINE USERS

FIELD OF THE INVENTION

The present invention is related to the fields of monitoring services and instant messaging, and more particularly, to providing message monitoring and management services for users in an instant messaging environment.

BACKGROUND OF THE INVENTION

With the tremendous advances in technology over the years, people have increasingly taken advantage of these technological advances in order to fulfill their needs. For example, people can now communicate rapidly with other people via computer networks and the Internet by utilizing technologies such as electronic mail and instant messaging. Instant messaging has a particular advantage in that it provides the capability of real-time communication between two or more users using instant messaging clients over a network. However, as a greater number of users began to use instant messaging, they desired to have the ability to message other users when those other users were either offline or otherwise unavailable. As a result, a few of the instant messaging platforms modified their platforms to allow users to send messages to offline users for eventual delivery to the offline users when they came back online.

Although various technology solutions exist for sending messages to offline users using instant messaging clients, existing solutions require the application providing a message monitoring service to be completely trusted by the instant messaging service before being allowed to access messages intended for an offline user. Current message monitoring services typically need to be implemented as part of an instant messaging server and utilize the security credentials of the user in order log in on behalf of the offline user and to perform message monitoring services. Such a requirement can provide the message monitoring service with complete access to the user's account and other information.

As a result, there is a need for more efficient and effective systems for providing electronic monitoring and management services for an instant messaging user by utilizing security tokens.

SUMMARY OF THE INVENTION

The present invention is directed to systems and methods for providing electronic monitoring and management services for an instant messaging user. In particular, a bot program can be provided which can take messages on behalf of a user according to the preferences of the user. Notably, the bot program can operate without having to be implemented as a part of an instant messaging server accessed by the user and can be provided with limited access to the user's security credentials and instant messaging account. Furthermore, it is important to note that the present invention can be applicable to virtually any instant messaging platform.

One embodiment of the invention is a computer-based system for providing electronic monitoring and management services for an instant messaging user. The system can include a processor configured to execute computer-readable instructions. The system can also include an instant messaging server, wherein the instant messaging server accepts connections from one or more instant messaging clients. Additionally, the system can include a bot program configured to execute on the processor. The bot program can be configured to receive a request from a first user to manage messages on behalf of the first user and further receive a token from the first user and a user name associated with the first user, wherein the first user is logged into the instant messaging server via an instant messaging client of the one or more instant messaging clients. Also, the bot program can be configured to receive a notification indicating that the first user is logged off the instant messaging server. Furthermore, the bot program can further be configured to utilize the token and the user name to log into the instant messaging server on behalf of the first user upon receiving the notification. Moreover, the bot program can be configured to receive and store a message intended for the first user from a second user utilizing another instant messaging client of the one or more instant messaging clients.

Another embodiment of the invention is a computer-based method for providing electronic monitoring and management services for an instant messaging user. The method can include receiving at a bot program a request from a first user to manage messages on behalf of the first user and further receiving a token from the first user and a user name associated with the first user. The method can also include receiving at the bot program a notification indicating that the first user is logged off an instant messaging server communicatively linked with an instant messaging client utilized by the first user. Furthermore, the method can include utilizing the token and the user name to log into the instant messaging server on behalf of the first user upon receiving the notification. Moreover, the method can include receiving and storing a message intended for the first user from a second user.

Yet another embodiment of the invention is a computer-readable storage medium that contains computer-readable code, which when loaded on a computer, causes the computer to perform the following steps: receiving at a bot program a request including one or more user preferences from a first user to manage messages on behalf of the first user and further receiving a token from the first user and a user name associated with the first user; receiving at the bot program a notification indicating that the first user is logged off an instant messaging server communicatively linked with an instant messaging client utilized by the first user; utilizing the token and the user name to log into the instant messaging server on behalf of the first user upon receiving the notification; receiving at the bot program a message intended for the first user from a second user; and, storing the message intended for the first user.

BRIEF DESCRIPTION OF THE DRAWINGS

There are shown in the drawings, embodiments which are presently preferred. It is expressly noted, however, that the invention is not limited to the precise arrangements and instrumentalities shown.

FIG. 2 is a flowchart of steps in a method for providing electronic monitoring and management services for an instant messaging user, according to another embodiment of the invention.

DETAILED DESCRIPTION

Figure 1:
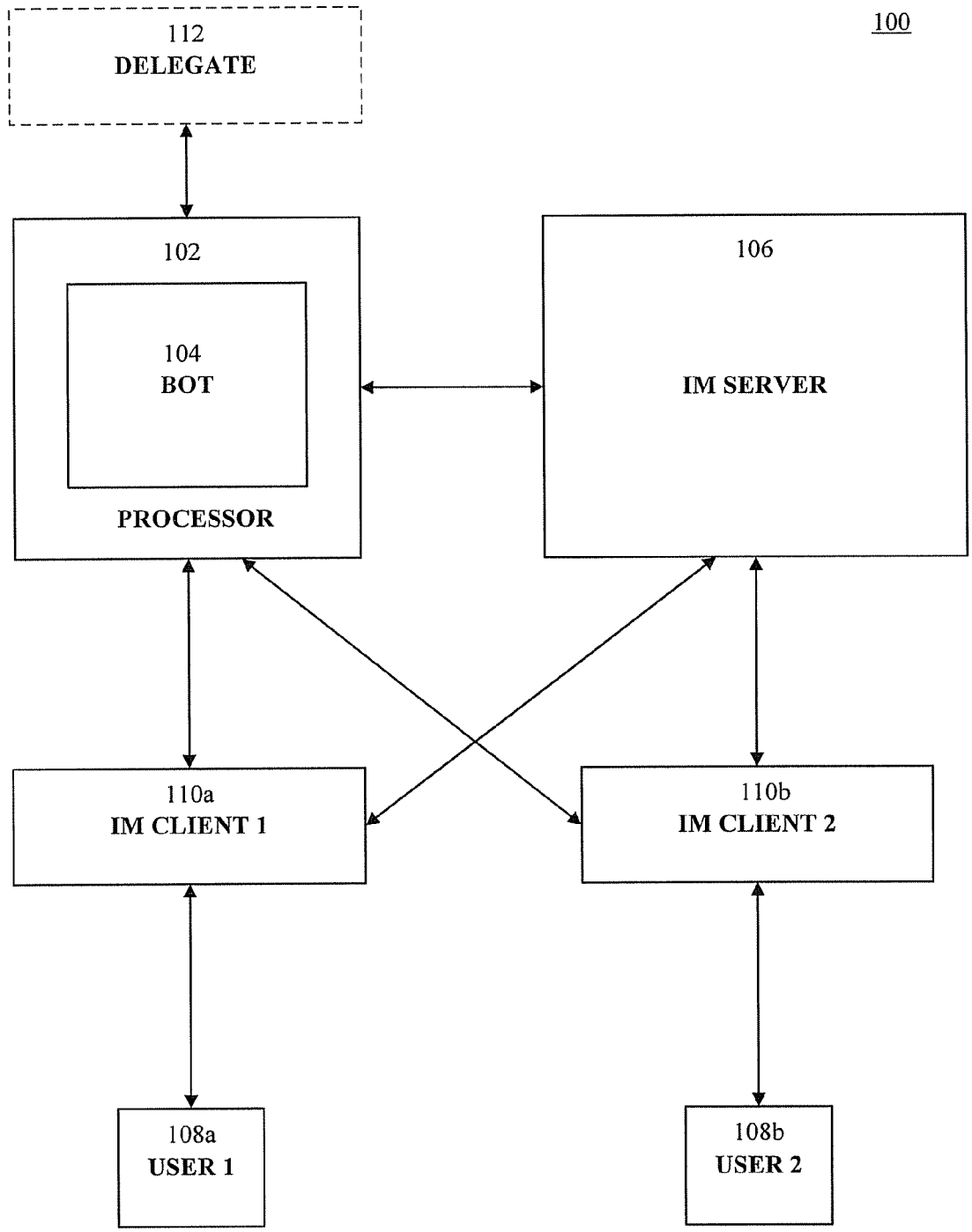
FIG. 1 is a schematic view of a system for providing electronic monitoring and management services for an instant messaging user, according to one embodiment of the invention.

Referring initially to FIG. 1, a schematic view of a system 100 for providing electronic monitoring and management services for an instant messaging (IM) user, according to one embodiment of the invention, is illustrated. The system 100 can include a processor 102 configured to execute computer-readable instructions and a bot program 104 configured to execute on the processor 102. The system 100 can also include an IM server 106, first and second users 108*a-b*, IM clients 110*a-b*, and a delegate 112. The users 108*a-b* can utilize the IM clients 110*a-b* to communicatively link to the bot program 104 and/or the IM server 106. Although one processor 102, one bot program 104, one IM server 106, two users 108*a-b*, two IM clients 110*a-b*, and one delegate 112 are shown, it will be apparent to one of ordinary skill based on the description that a greater number of processors 102, bot programs 104, IM servers 106, and delegates 112 and a greater or lesser number of users 108*a-b* and IM clients 110*a-b* can be utilized in the system 100.

As previously mentioned, the system 100 for providing electronic monitoring and management services for an IM user can include a bot program 104. The bot program 104 can be implemented as computer-readable code configured to execute on the processor 102. Alternatively, the bot program 104 can be implemented in hardwired, dedicated circuitry for performing the operative functions described herein. In yet another embodiment, however, the bot program 104 can be implemented in a combination of hardwired circuitry and computer-readable code.

Typically, when users, such as users 108*a-b*, want to participate in an IM session they will enter in a user name and password into an IM client, such as IM clients 110*a-b*, in order to log in to an IM server 106. The users 108*a-b* use their IM clients 110*a-b* to display and maintain lists, also known as buddy lists, which typically contain a list of other users they often communicate with. Once the users 108*a-b* have logged into the IM server 106, the IM server 106 checks to see if users contained in the buddy lists are online, and, if so, the IM server 106 notifies the IM clients 110*a-b*. The IM clients 110*a-b* then indicate which users in the buddy list are online. Users who are online can communicate in real-time with other users who are online, however, users also want to be able to send messages to other users even after the other users are offline.

Operatively, the system 100 can be utilized to allow an independent third party to offer message monitoring services without necessarily having to be implemented as part of the IM server 106 or having complete trusted access by the IM server 106. The message monitoring services can be provided by the bot program 104 and can be utilized to take messages on behalf of a particular user when they go offline or are otherwise unavailable. Notably, a message is not intended to be limited to being comprised of text, but can also be comprised of voice, video, sounds, files, or anything capable of being transmitted between IM users 108*a-b*.

Initially, the bot program 104 can act much like a typical IM user in that it can log into an IM client (not explicitly shown) with its own user name, e.g. "minderbot," and other credentials. In fact, the bot program 104 can also be added by the users 108*a-b* to their respective buddy lists in the same way that regular users can be added to their buddy list. If, for example, user 108*a* wants to go offline, but still wants to be able to capture messages while they are offline, user 108*a* can send a message or request to the bot program 104 to inform the bot program 104 that he would like to have his messages captured and monitored while he is offline. The message or request sent to the bot program 104 can be in any format recognizable by the bot program 104. For example, first user 108*a* can select "minderbot" (the bot program 104) from his buddy list, open an IM window to initiate a chat, and send a message to "minderbot" stating "Coverme," which the bot program 104 can interpret as a command to monitor the first user's 108*a* messages. Of course, the first user 108*a* can request the bot program's 104 assistance through other methods including, but not limited to, selecting an option in the IM client's 110*a* interface, directly selecting the bot program 104 through a mouse click or other means, sending a request automatically upon logoff, or by setting the bot program 104 to run at a particular time.

The bot program 104 can receive the request from the first user 108*a* so as to manage messages on behalf of the first user 108*a*. Also, the first user 108*a* can ask the IM server 106 for a token for allowing the bot program 104 to log into the IM server 106. Instead of having to transmit a user name and a password, the first user 108*a* can transmit the token and a user name associated with the first user 108*a* to the bot program 104 so as to enable the bot program 104 to log in on behalf of the first user 108*a*. Notably, the token does not have to contain the security credentials of the first user 108*a*, and, therefore, does not have to grant the bot program 104 full access to the first user's 108*a* account and information when the bot program 104 monitors or accesses the first user's 108*a* messages. In fact, the token can dictate the level of access the bot program 104 can have and can, for example, limit the bot program 104 to only receiving the first user's 108*a* messages. The token can also be set to expire after a period of time, which further increases security for the first user 108*a*. After the token expires, the bot program 104 can receive other tokens for logging in on behalf of the first user 108*a*.

After receiving the request, the token, and the first user's 108*a* user name, the bot program 104 can receive a notification indicating that the first user 108*a* is logged off the IM server 106. This notification can be triggered automatically after the first user 108*a* either logs out or is otherwise disconnected. The bot program 104 can then utilize the token and the user name to log into the IM server 106 on behalf of the first user 108*a* upon receiving the notification. Even though the first user 108*a* has logged off, first user 108*a* can still appear to be online since the bot program 104 has logged in on behalf of the first user 108*a*. The bot program 104 can then receive and store messages intended for the first user 108*a* that are sent by the second user 108*b* utilizing IM client 110*b* or any other user. Also, the bot program 104 can respond to the second user by 108*b* indicating that the bot program 104 has received the message on behalf of the first user 108*a* and that it will deliver the message when the first user 108*a* is back online. When the first user 108*a* logs back into IM client 110*a*, the bot program 104 can be configured to forward any messages stored on behalf of the first user 108*a* to the first user 108*a*. The bot program can also log out of the IM server 106 when the first user 108*a* logs back in.

According to a particular embodiment, the bot program 104 can be configured to add the first user 108*a* to a buddy list of the bot program 104 after receiving the request to manage messages on behalf of the first user. Once the first user 108*a* is added to the list, the bot program 104 can monitor the buddy list for an alert indicating that the first user has logged off the IM server 106. For example, if the first user 108*a* is in the bot program's 104 list, the bot program 104 can notice that the status of the first user 108*a* has changed from "online" to "offline." In another embodiment, the bot program 104 can be configured to receive another request from the first user 108*a*. This other request can signal the bot program 104 to remove the first user 108*a* from the bot program's 104 buddy list, to stop managing messages on behalf of the first user, or to perform other IM related-actions.

In one embodiment, the request to manage messages on behalf of the first user 108*a* or any other requests received by the bot program 104 can include one or more one user preferences. These user preferences can be selected by the first user 108*a* prior to sending the request to the bot program 104. The one or more user preferences can specify, but are not limited to, one or more of a status message to be utilized by the bot program 104 to indicate the status of the first user 108*a* to the second user 108*b*, a reply message to be sent to the second user 108*b* on behalf of the first user 108*a* in response to messages received by the bot program 104 from the second user 108*b*, a designated delegate, and IM-related actions. For example, first user 108*a* can send a request including a user preference specifying a particular status message such as "I am in an area of poor cell phone coverage and may be offline regularly" or "I am out to lunch and I will be back at 2 p.m." The status message can be viewed by the second user 108*b* through a variety of means, with one such example being hovering a mouse pointer over the user name of the first user 108*a*.

However, often times, users do not always read the status message left by a particular user. When such a case arises, it is often useful to have an automated reply message as well. For example, the first user 108*a* can include a reply message with his/her request so that the bot program 104 can respond to a message received by the second user 108*b* with the specified reply message. The status messages and reply messages can also be used to indicate that even though the first user 108*a* technically appears to be online that in reality it is the bot program 104 logged in on behalf of the first user 108*a*. For example, the reply message can state "the first user is not online, this is just the minderbot listening for messages on his behalf."

As mentioned above, the first user 108*a* can also specify a particular delegate 112 to the bot program 104. The delegate 112, for instance, can be a particular user's assistant or friend, another user, or even a program. The bot program 104 can be configured to forward messages received from the second user 108*b* to the designated delegate 112. The messages can be forwarded to the delegate 112 instead of being sent to the first user 108*a* or in addition to being sent to the first user 108*a*. Additionally, the bot program 104 can be configured to notify the designated delegate 112 that the bot program 104 has stored the message on behalf of the first user 108*b*. For example, the bot program 104 can forward a message to the delegate 112 stating "I have stored messages on behalf of the first user" to notify the delegate 112.

According to one embodiment, the bot program 104 can be configured to specify the amount of time the first user 108*a* was logged off from the IM server 106. The bot program 104 can also specify a total number of messages received from other users. In another embodiment, the second user 108*b* can be given the option of canceling any messages that were sent by the second user 108*b* and handled/stored by the bot program 104. For example, if the second user 108*b* wants to cancel a message because the message is no longer required, it was sent to the wrong person, or for some other reason, the second user 108*b* can send a message to the bot program 104 to cancel the message.

In still another embodiment, if the second user 108*b* is logged on when the first user 108*a* sends a message in response to the second user's 108*b* message, the second user 108*b* can be provided with a user interface to start a chat window for responding back to the first user 108*a*. In yet another embodiment, if the second user 108*b* is logged off when the first user 108*a* sends a message in response to the second user's 108*b* message, the message of the first user 108*a* can be stored by the bot program 104. Furthermore, the bot program 104 can forward the stored message of the first user 108*a* to the second user 108*b* when the second user 108*b* logs back on.

According to another embodiment, an intelligent agent (not explicitly shown) communicatively linked to the IM server 106 and to the bot program 104 can be requested to generate a response to the message from the second user 108*b*. Notably, the intelligent agent can be implemented as computer-readable code configured to execute on the processor 102. Alternatively, the intelligent agent can be implemented in hardwired, dedicated circuitry for performing the operative functions described herein. The intelligent agent can also be implemented in a combination of hardwired circuitry and computer-readable code. The response made by the intelligent agent can be based on one or more of the content of the message and the identity of the second user. For example, if the second user 108*b* sends a message pertaining to computers, the intelligent agent can generate a response taking computers into account.

Referring now to FIG. 2, a flowchart is provided that illustrates certain method aspects of the invention. The flowchart depicts steps of a method 200 for providing electronic monitoring and management services for an instant messaging user. The method 200 illustratively includes, at the start step 202, receiving at a bot program a request from a first user to manage messages on behalf of the first user and further receiving a token from the first user and a user name associated with the first user. The method 200 also includes receiving at the bot program a notification indicating that the first user is logged off an instant messaging server communicatively linked with an instant messaging client utilized by the first user at step 204. At step 206, the method 200 can include utilizing the token and the user name to log into the instant messaging server on behalf of the first user upon receiving the notification. Notably, the token can be set to expire after a period of time. Upon expiration, the bot program can periodically receive other tokens for logging into the instant messaging server on behalf of a user. At the ending step 208, the method can further include receiving and storing a message intended for the first user from a second user. It is important to note that steps in the method 400 can be performed by utilizing various forms of devices, hardware, and software. Notably, the hardware and devices can include, but are not limited to, processors, computers, and the like.

According to a particular embodiment, the method 200 can include forwarding the stored message to the first user when the first user logs back into the instant messaging server. In another embodiment, the method 200 can include logging the bot program out of the instant messaging server when the first user logs back into the instant messaging server. Additionally, the method 200 can further comprise adding the first user to a buddy list of the bot program after receiving the request to manage messages on behalf of the first user. The bot program can monitor the buddy list for an alert indicating that the first user has logged off from the instant messaging server. Also, the method 200 can include receiving at the bot program another request from the first user. This other request can signal the bot program to remove the first user from the buddy list of the bot program, to stop managing messages on behalf of the first user, or any other action that the first user would want the bot program to perform.

Notably, any of the requests received by the bot program can include one or more user preferences from the first user or potentially other users. In one embodiment, the one or more user preferences can specify one or more of a status message to be utilized by the bot program to indicate the status of the first user to the second user, a reply message to be sent to the second user on behalf of the first user by the bot program in response to the message received from the second user, and a designated delegate. The user preferences are not limited to the instances listed above and are merely intended to be an indication of what a user preference can be. The method 200 can further include causing the bot program to perform one or more of forwarding the received message to the designated delegate and notifying the designated delegate that the bot program has stored the message on behalf of the first user.

In a particular embodiment, the method 200 can further comprise requesting an intelligent agent to generate a response to the message from the second user, wherein the response is based on one or more of the content of the message and the identity of the second user. In another embodiment, the method 200 can also include providing an indication specifying one or more of the amount of time the first user was logged off from the instant messaging server and a total number of messages received from the second user. In yet another embodiment, the method 200 can further comprise enabling the second user to cancel the stored message. The second user can cancel the message the second user sent to the bot program before the first user views or accesses the message.

According to another embodiment, if the second user is logged on when the first user sends a message in response to the message of the second user, the second user can be provided with a user interface to start a chat window for responding back to the first user. In still another embodiment, if the second user is logged off when the first user sends a message in response to the message of the second user, the message of the first user can be stored by the bot program. When the second user logs back in, the stored message of the first user can be forwarded to the second user.

The invention, as already mentioned, can be realized in hardware, software, or a combination of hardware and software. The invention can be realized in a centralized fashion in one computer system, or in a distributed fashion where different elements are spread across several interconnected computer systems. Any type of computer system or other apparatus adapted for carrying out the methods described herein is appropriate. A typical combination of hardware and software can be a general purpose computer system with a computer program that, when being loaded and executed, controls the computer system such that it carries out the methods described herein.

The invention, as already mentioned, can be embedded in a computer program product, such as magnetic tape, an optically readable disk, or other computer-readable medium for storing electronic data. The computer program product can comprise computer-readable code, defining a computer program, which when loaded in a computer or computer system causes the computer or computer system to carry out the different methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The preceding description of preferred embodiments of the invention have been presented for the purposes of illustration. The description provided is not intended to limit the invention to the particular forms disclosed or described. Modifications and variations will be readily apparent from the preceding description. As a result, it is intended that the scope of the invention not be limited by the detailed description provided herein.

I claim:

1. A computer-based method for providing electronic monitoring and management services for an instant messaging user, the method comprising:
   receiving at a bot program a request from a first user to manage messages on behalf of the first user and further receiving a token from the first user and a user name associated with the first user:
   receiving at the bot program a notification indicating that the first user is logged off an instant messaging server communicatively linked with an instant messaging client utilized by the first user;
   utilizing the token and the user name to automatically log the bot program into the instant messaging server on behalf of the first user upon receiving the notification; and
   receiving and storing a message at the bot program intended for the first user from a second user.

2. The method of claim 1, further comprising forwarding the stored message to the first user when the first user logs back into the instant messaging server.

3. The method of claim 1, further comprising logging the bot program out of the instant messaging server when the first user logs back into the instant messaging server.

4. The method of claim 1, further comprising adding the first user to a buddy list of the bot program after receiving the request to manage messages on behalf of the first user, wherein the bot program monitors the buddy list for an alert indicating that the first user has logged off from the instant messaging server.

5. The method of claim 4, further comprising receiving at the bot program another request from the first user, wherein the another request signals the bot program to perform at least one of removing the first user from the buddy list and stopping management of messages on behalf of the first user.

6. The method of claim 1, wherein the request received at the bot program includes at least one user preference from the first user.

7. The method of claim 6, wherein the at least one user preference specifies at least one of a status message, a reply message, and a designated delegate.

8. The method of claim 6, wherein the at least one user preference specifies at least a designated delegate comprising a third user, and wherein the bot program performs at least one of forwarding the received message to the designated delegate and notifying the designated delegate that the bot program has stored the message on behalf of the first user.

9. The method of claim 1, further comprising requesting an intelligent agent to generate a response to the message from the second user, wherein the response is based on at least one of the content of the message and the identity of the second user.

10. The method of claim 1, further comprising providing an indication specifying at least one of the amount of time the first user was logged off from the instant messaging server and a total number of messages received from the second user.

11. The method of claim 1, further comprising enabling the second user to cancel the stored message.

12. The method of claim 1, further comprising if the second user is logged on when the first user sends a message in response to the message of the second user, providing the second user with a user interface to start a chat window for responding back to the first user.

13. The method of claim 1, further comprising if the second user is logged off when the first user sends a message in response to the message of the second user, storing the message of the first user at the bot program, and further comprising forwarding the stored message of the first user to the second user when the second user logs back on.

14. The method of claim 1, wherein the token is set to expire after a period of Time.

15. The method of claim 14, wherein the bot program receives another token for logging into the instant messaging server on behalf of the first user after the token has expired.

16. A computer-based system for providing electronic monitoring and management services for an instant messaging (IM) user, the system comprising:
 a processor configured to execute computer-readable instructions;
 an IM server, wherein the IM server accepts connections from at least one IM client;
 a bot program configured to execute on the processor, wherein the bot program is configured to:
  receive a request from a first user to manage messages on behalf of the first user and further receive a token from the first user and a user name associated with the first user, wherein the first user is logged into the IM server via an IM client of the at least one IM client;
  receive a notification indicating that the first user is logged off the IM server;
  utilize the token and the user name to automatically log the bot program into the IM server on behalf of the first user upon receiving the notification; and
  receive and store a message the bot program intended for the first user from a second user utilizing another IM client of the at least one IM client.

17. The system of claim 16, wherein the bot program is configured to forward the stored message to the first user when the first user logs back into the IM server.

18. The system of claim 16, wherein the bot program is configured to log out of the IM server when the first user logs back into the IM server.

19. The system of claim 16, wherein the bot program is configured to add the first user to a buddy list of the bot program after receiving the request to manage messages on behalf of the first user, wherein the bot program monitors the buddy list for an alert indicating that the first user has logged off from the IM server.

20. The system of claim 19, wherein the bot program is configured to receive another request from the first user, wherein the another request signals the bot program to perform at least one of removing the first user from the buddy list and stopping management of messages on behalf of the first user.

21. The system of claim 16, wherein the request received at the bot program includes at least one user preference from the first user.

22. The system of claim 21, wherein the at least one user preference specifies at least one of a status message, a reply message, and a designated delegate.

23. The system of claim 21, wherein the at least one user preference specifies at least a designated delegate comprising a third user, and wherein the bot program is configured to perform at least one of forwarding the received message to the designated delegate and notifying the designated delegate that the bot program has stored the message on behalf of the first user.

24. The system of claim 16, further comprising requesting an intelligent agent communicatively linked to the IM server and to the bot program to generate a response to the message from the second user, wherein the response is based on at least one of the content of the message and the identity of the second user.

25. The system of claim 16, wherein the bot program is configured to specify at least one of the amount of time the first user was logged off from the IM server and a total number of messages received from the second user.

26. The system of claim 16, further comprising enabling the second user to cancel the stored message.

27. The system of claim 16, further comprising if the second user is logged on when the first user sends a message in response to the message of the second user, providing the second user with a user interface to start a chat window for responding back to the first user.

28. The system of claim 16, further comprising if the second user is logged off when the first user sends a message in response to the message of the second user, storing the message of the first user at the bot program, and further comprising forwarding the stored message of the first user to the second user when the second user logs back on.

29. The system of claim 16, wherein the token is set to expire after a period of Time.

30. The system of claim 29, wherein the bot program is configured to receive another token for logging into the IM server on behalf of the first user after the token has expired.

31. A non-transitory computer-readable storage medium having stored therein computer-readable instructions, which, when loaded in and executed by a computer causes the computer to perform the steps of:
 receiving at a bot program a request including at least one user preference from a first user to manage messages on behalf of the first user and further receiving a token from the first user and a user name associated with the first user;
 receiving at the bot program a notification indicating that the first user is logged off an instant messaging server communicatively linked with an instant messaging client utilized by the first user;
 utilizing the token and the user name to automatically log the bot program into the instant messaging server on behalf of the first user upon receiving the notification;
 receiving at the bot program a message intended for the first user from a second user; and
 storing the message the bot program intended for the first user.

32. The non-transitory computer-readable storage medium of claim 31, further comprising forwarding the message to the first user when the first user logs back into the instant messaging server.

33. The non-transitory computer-readable storage medium of claim 31, further comprising computer-readable code for causing the computer to log the bot program out of the instant messaging server when the first user logs back into the instant messaging server.

34. The non-transitory computer-readable storage medium of claim 31, further comprising computer-readable code for causing the computer to add the first user to a buddy list of the bot program after receiving the request to manage messages on behalf of the first user, wherein the bot program monitors the buddy list for an alert indicating that the first user has logged off from the server.

35. The non-transitory computer-readable storage medium of claim 34, further comprising receiving at the bot program another request from the first user, wherein the another request signals the bot program to perform at least one of removing the first user from the buddy list and stopping management of messages on behalf of the first user.

36. The non-transitory computer-readable storage medium of claim 31, wherein the at least one user preference specifies at least one of a status message, a reply message, and a designated delegate.

37. The non-transitory computer-readable storage medium of claim 31, wherein the at least one user preference specifies at least a designated delegate comprising a third user, and wherein the bot program performs at least one of forwarding the received message to the designated delegate and notifying the designated delegate that the bot program has stored the message on behalf of the first user.

38. The non-transitory computer-readable storage medium of claim 31, wherein the token is set to expire after a period of time.

39. The non-transitory computer-readable storage medium of claim 38, wherein the bot program receives another token for logging into the instant messaging server on behalf of the first user after the token has expired.

* * * * *